United States Patent [19]

Nissen

[11] 4,201,573

[45] May 6, 1980

[54] RECOVERY OF METAL VALUES FROM A SOLUTION BY MEANS OF CEMENTATION

[75] Inventor: Reinhard Nissen, Cologne, Fed. Rep. of Germany

[73] Assignee: Klöckner-Humboldt-Deutz Aktiengesellschaft, Fed. Rep. of Germany

[21] Appl. No.: 18,187

[22] Filed: Mar. 7, 1979

[30] Foreign Application Priority Data

Mar. 7, 1978 [DE] Fed. Rep. of Germany ....... 2809702

[51] Int. Cl.² .......................................... C22B 15/12
[52] U.S. Cl. .......................................... 75/109; 75/76; 75/117
[58] Field of Search ............................ 75/109, 117, 76

[56] References Cited

U.S. PATENT DOCUMENTS

| | | | |
|---|---|---|---|
| 684,578 | 10/1901 | Merrill | 75/109 X |
| 860,661 | 7/1907 | Hendryx | 75/109 X |
| 1,575,160 | 3/1926 | Giertsen | 75/109 X |
| 3,674,466 | 7/1972 | Anderson et al. | 75/109 |
| 3,748,124 | 7/1973 | Case et al. | 75/109 |
| 3,874,940 | 4/1975 | Vera et al. | 75/109 |
| 4,152,142 | 5/1979 | Sclitt et al. | 75/117 X |
| 4,152,143 | 5/1979 | Kausel et al. | 75/117 X |

*Primary Examiner*—G. Ozaki
*Attorney, Agent, or Firm*—Hill, Van Santen, Steadman, Chiara & Simpson

[57] ABSTRACT

A method for the recovery of metal values from a solution by means of a cementation reaction in an oscillating container wherein the resulting cementate is converted by pyrometallurgical methods into molten metal and slag. In accordance with the present invention, at least a portion of the slag in particulate form is directed back into the oscillation reaction to serve as an agitation medium.

5 Claims, 1 Drawing Figure

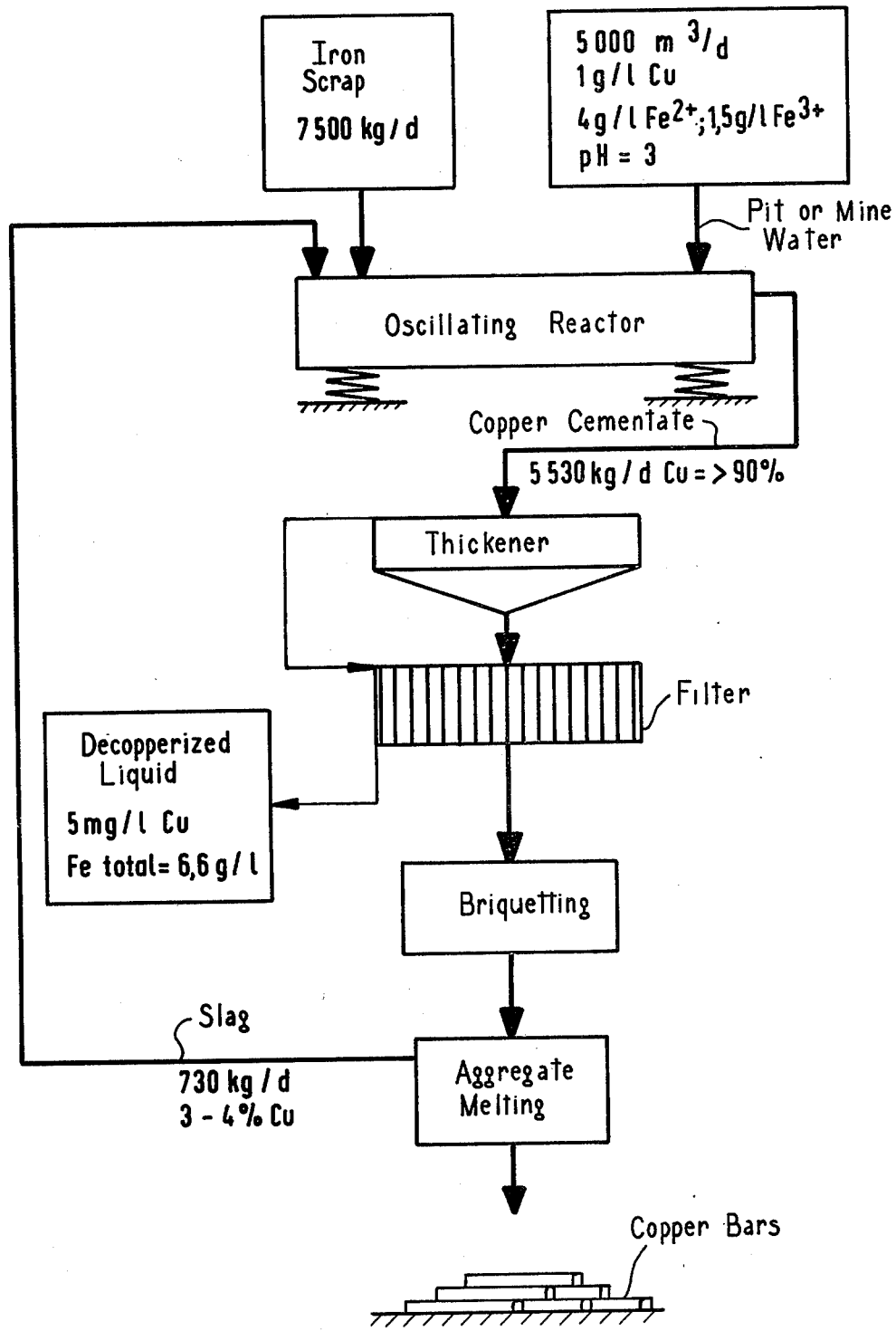

RECOVERY OF METAL VALUES FROM A SOLUTION BY MEANS OF CEMENTATION

BACKGROUND OF THE INVENTION

1. Field of the Invention

The present invention is in the field of processes for the recovery of metal values from solution followed by pyrometallurgical treatment of the cementate and ultimate recovery of the metal in relatively pure form.

2. Description of the Prior Art

Cementation processes have been carried out in an oscillating container filled at least partially with pieces of a cementation medium as shown, for example, in German Laid Open Specification No. 24 57 660. In this publication, there is a disclosure of precipitating copper cement from a copper solution mixed with iron pieces as a precipitant. The iron pieces are shaken in an oscillating reactor with suitable frequency and amplitude so that the pieces of iron constantly rub against each other and the copper which is constantly being precipitated on the cementation medium in the form of a coating is continually scoured off the surfaces of the iron pieces. With this type of arrangement, using a constant substantial voltage potential between the iron and copper solution, the cementation may be completed rapidly and without hindrance.

A similar method has been described in German Patent Specification No. 26 02 849 wherein both the leaching process as well as the precipitation process is carried out simultaneously in the same reaction vessel. In this procedure, the oscillating bodies are, for example, crude iron granulates, stamping waste, and other bodies such as cast metal scrap, pig iron, or puddled iron.

In known cementation methods, for example, the known GLPF method (Grinding, Leaching, Precipitating, Flotation), the relatively pure cement metal recovered after the flotation was usually subjected to a pyrometallurgical melting process. The cementate was preferably melted under reducing conditions, while the cementation medium such as for example iron or zinc was converted by means of addition of slag formers such as sand, limestone, and the like into a slag phase. Such slags, however, contain significant residual contents of the metal values from the cementate. These slags were previously disposed of as tailings or, after comminution and grinding, treated additionally for the recovery of the metal values. In either event, there are appreciable losses in residual metal or substantial additional costs involved.

SUMMARY OF THE INVENTION

In accordance with the present invention, losses of residual metal content remaining in the slag, which ordinarily amount to about 3 to 4% by weight, are reduced or prevented as are the additional costs and expenditures for the comminution, grinding and disintegration of the slag. In accordance with the present invention, at least an appreciate part of the slag is recycled in the form of lumps back into the cementation process to act as agitator bodies.

DESCRIPTION OF THE PREFERRED EMBODIMENTS

A recirculation of the slag in the form of lumps according to the present invention as part of an overall wet metallurgical-pyrometallurgical process has the following advantages:

1. There is an approximately cost-free recovery of the oxidic metal content of metals in the slag containing, for example, 3 to 4% of such metal values through simultaneous comminution, leaching, and cementation immediately following.

2. A simultaneous neutralization of the excess acid contained in pit or mine waste waters results, so that there is a reduced amount of cementation media required. For example, in the case of copper cementation, the use of iron cementing medium is appreciably reduced.

3. A high proportion of silicate in the slag causes an additional activation of the metallic cementation medium in that through an intensive abrasion effect, passive layers of oxide type layers are removed, and therefore both the electrochemical potential as well as the reduction in concentration are maintained to their fullest effect.

4. Insoluble silicates are brought into circulation so that for the reducing pyrometallurgical process, smaller additional quantities are needed for use in the pyrometallurgical reduction.

The slag recirculation method according to the present invention may be utilized for many processes involving cementation, in an oscillating reactor during agitation by means of a cementation medium wherein metal cementates such as, for example, copper, nickel, cadmium and the like are recovered which are subsequently subjected to a pyrometallurgical melting method.

In accordance with the present invention, the slag is returned from the melting process and, also, waste materials in the oscillating reactor may be removed both without previous grinding. The lumps of cementation media present in the oscillating reactor together with the grinding and agitation bodies present therein in combination with the introduced lumps of slag evidence a reinforced agitation and grinding effect. The efficiency of the solution and cementation steps is thereby improved because the portions of the metal value still contained in the slag go into solution immediately and are cemented again by means of the cementation medium.

In the case of waste metals which contain, in addition to oxidic constituents, also metallic constituents of the cementation medium, the oxidic constituents are chemically dissolved by means of an excess solvent such as sulfuric acid, hydrochloric acid, or ammonium hydroxide, while the metallic constituents contribute to the cementation itself.

In this manner, the economy of the entire process is improved in two ways. For one, after-treatment of the slag by grinding is eliminated and, second, the cementation process itself is accelerated because of the influence of the slag in increasing the reaction velocity.

The invention will be described in greater detail in connection with an example which is illustrated in the drawing in the form of a flow chart.

As seen in the drawing, there may occur from a mine operation an effluent of 5000 cubic meters per day of mine or pit water. The solution may contain an average of 1 gram per liter of copper in solution as well as 4 grams per liter of iron in divalent form and 1.5 grams per liter of iron in trivalent form. The acidity of the solution amounts to a pH of about 3.

This mine or pit water is supplied to an oscillating container which contains agitator bodies filling about 70% of the reactor volume, and consisting of iron scrap. The total quantity of scrap amounts to about 7500 kilograms per day. The oscillating container produces a copper cementate which contains more than 90% metallic copper, with an average purity of approximately 95%. The per diem quantity of copper produced amounts to 5530 kg. The copper cementate is supplied with the slurry flowing off to a thickener which thickens the pulp to a concentration of about 70%. The thickened pulp is supplied to a filter for further dehydration. The filter produces a filter cake and a decopperized liquid.

The decopperized liquid contains about 5 mg/l of copper and approximately 6.6 g/l of iron ions. The copper cake is subsequently briquetted and delivered to a melting aggregate where, under reducing conditions, the copper is melted with the production of a liquid slag. The molten copper is subsequently cast into crude copper bars while the slag is granulated by introducing it into a water bath. The amount of slag produced amounts to about 730 kg/day, and has a metallic copper content in the range of about 3 to 4% by weight. The granulated slag is conveyed back into the oscillating container by means of any suitable transporting device.

As previously stated, the slag recirculation method is utilizable for similar processes in which a cementation process is carried out in an oscillating reaction and cementates are separated out and subsequently subjected to a pyrometallurgical melting method. One of the advantages of the method lies in the fact that the grinding of the slag is eliminated as the cementation medium in the oscillating reactor provides a sufficient grinding effect. The metal values contained in the slag are leached into solution while the metallic constituents themselves contribute to the cementation as cementation media. All of this is achieved with the invention as side effects, without providing additional costs.

It should be evident that various modifications can be made to the described embodiments and that the invention should be limited only insofar as required by the submitted patent claims.

I claim as my invention:

1. In a method for the recovery of metal values by cementation wherein the metal to be recovered is precipitated by means of a cementation medium in an oscillating reactor, the resulting cementate is converted by pyrometallurgical methods into molten metal and slag, the improvement which comprises:

conveying a portion of the slag in particulate form back into said oscillation reactor to serve as an agitation medium.

2. A method according to claim 1 in which said metal to be recovered is copper and said cementation medium is predominantly iron.

3. A method according to claim 1 in which said cementate is filtered and briquetted before being rendered molten.

4. A method according to claim 1 in which said cementation medium is zinc.

5. A method according to claim 2 in which the copper content of the slag is about 3 to 4% by weight.

* * * * *